United States Patent [19]

Ohmura

[11] Patent Number: 4,930,592
[45] Date of Patent: Jun. 5, 1990

[54] REAR WHEEL TURNING SYSTEM FOR A VEHICLE

[75] Inventor: Hiroshi Ohmura, Hiroshima, Japan

[73] Assignee: Mazda Motor Corporation

[21] Appl. No.: 374,695

[22] Filed: Jul. 3, 1989

[30] Foreign Application Priority Data

Jul. 4, 1988 [JP] Japan .................... 63-166384

[51] Int. Cl.⁵ .............................. B62D 5/04
[52] U.S. Cl. .................. 180/79.1; 180/140;
180/142; 280/91; 364/424.05
[58] Field of Search ............ 180/79.1, 140, 142;
280/91; 364/424.05, 431.09

[56] References Cited

U.S. PATENT DOCUMENTS

| | | | |
|---|---|---|---|
| 4,532,567 | 7/1985 | Kade | 180/79.1 X |
| 4,625,822 | 12/1986 | Nakamura et al. | 180/142 X |
| 4,645,025 | 2/1987 | Ohe et al. | |
| 4,732,231 | 3/1988 | Kanazawa et al. | |
| 4,751,978 | 6/1988 | Drutches et al. | 180/142 |
| 4,807,135 | 2/1989 | Tamai | 364/424.05 |

Primary Examiner—Charles A. Marmor
Assistant Examiner—Mitchell Bompey
Attorney, Agent, or Firm—Sixbey, Friedman, Leedom & Ferguson

[57] ABSTRACT

A rear wheel turning system for turning the rear wheels of a vehicle in response to operation of the steering wheel includes an actuator having an electric motor which is energized by a battery. A rear wheel turning mechanism is driven by the electric motor and turns the rear wheels. A control unit outputs a control signal to the electric motor in order to cause the rear wheels to turn to a predetermined turning angle according to the operating condition of the vehicle. The control unit ceases controlling the electric motor when a predetermined condition is established after the engine has stalled.

14 Claims, 5 Drawing Sheets

F I G. 1
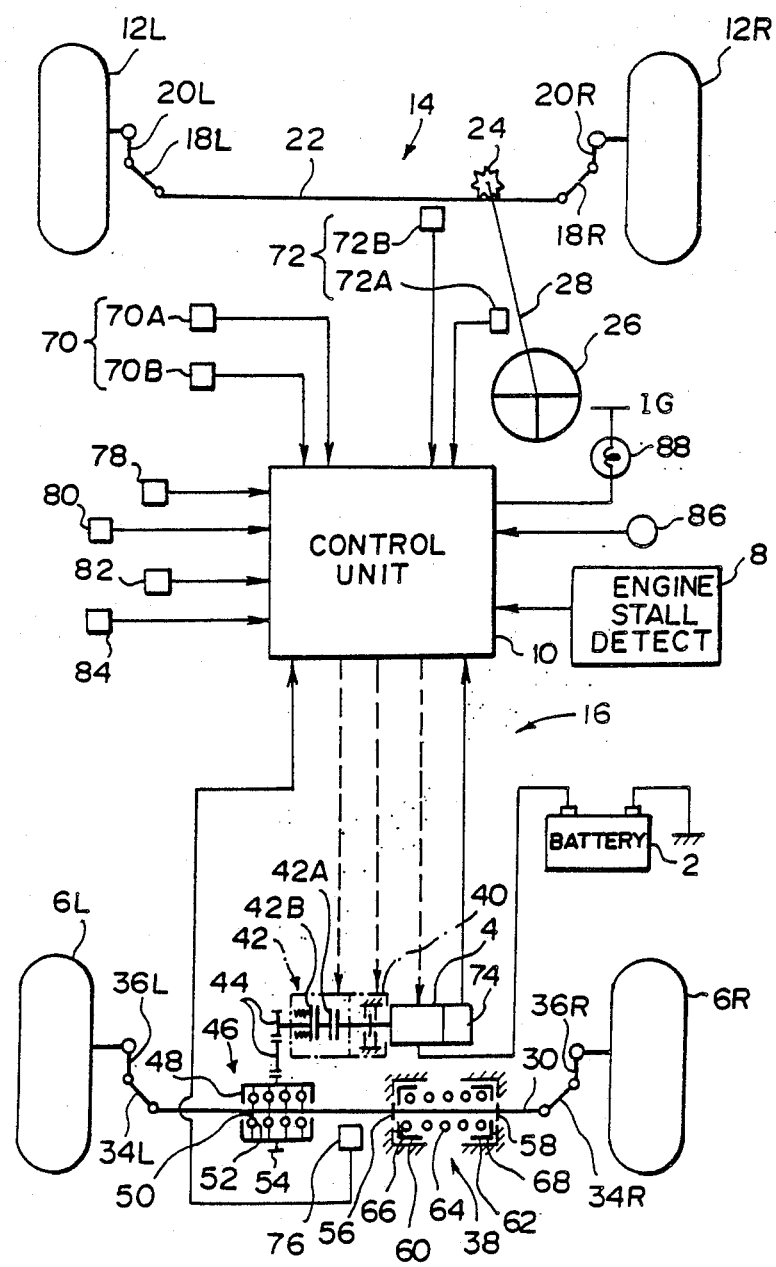

REAR WHEEL TURNING SYSTEM FOR A VEHICLE

BACKGROUND OF THE INVENTION

1. Field of the Invention

This invention relates to a rear wheel turning system for a vehicle, and more particularly to a rear wheel turning system for a vehicle in which the rear wheels are turned by an actuator which is driven by a battery mounted on the vehicle.

2. Description of the Prior Art

Though, in a conventional two-wheel-steered vehicle, only the front wheels are turned when the vehicle is steered, in four-wheel-steered vehicles which have been recently put into use, both the front wheels and the rear wheels are turned when the vehicle is steered. That is, such a four-wheel-steered vehicle is provided with a four-wheel steering system which comprises a rear wheel turning system for turning the rear wheels and a front wheel turning system for turning the front wheels.

In one type of known rear wheel turning system, the rear wheels are turned by an actuator which is driven by the engine output power of the vehicle, and in another type of known rear wheel turning system, the rear wheels are turned by an actuator which is driven by a battery mounted on the vehicle. For example, the rear wheel turning system disclosed in U.S. Pat. No. 4,732,231 comprises a hydraulic power cylinder which turns the rear wheels with the hydraulic pressure provided thereto from a hydraulic pump. The pressure is controlled by means of a control valve, and the hydraulic pump is driven by the engine.

In the case of a rear wheel turning system in which the rear wheels are turned by an actuator which is driven by the engine output power, the rear wheels can be turned only when the engine operates, and when the engine stalls, the rear wheels can no longer be turned. In order to make the vehicle safe when the rear wheel turning system becomes uncontrollable, there is generally provided a rear wheel neutralizing means which comprises a centering spring and urges the rear wheels toward the neutral position, i.e., the straight-ahead position. When the engine stalls, the rear wheel neutralizing means returns the rear wheels to the straight-ahead position, and thereafter the vehicle is made to behave as a two-wheel-steered vehicle.

However, the rear wheel turning system encounters the following problems.

For example, in the rear wheel turning system disclosed in the above identified patent publication, the rear wheels are turned in a direction opposite to the turning direction of the front wheels when the vehicle is running at a low speed in order to improve the heading performance and in the same direction as the turning direction of the front wheels when the vehicle is running at a high speed in order to improve the driving stability. When the engine stalls while the vehicle is travelling at a low speed, for instance, while it is being driven into or out of a garage, the vehicle is not generally braked at once and is allowed to run by inertia for a while. Since the rear wheels are returned to the straight-ahead position as soon as the engine stalls, the turning radius will become larger and the vehicle will follow a larger arc, which can cause an accident. Further, when the engine stalls while the vehicle is running downhill at a certain high speed, the driver will not generally restart the engine as soon as the engine stalls but will allow the vehicle to coast for a while with the engine in a stalled state. In such a case, the rear wheels are returned to the straight-ahead position as soon as the engine stalls. Accordingly, the attitude of the vehicle will change and the driving stability will deteriorate as the vehicle coasts.

On the other hand, in the rear wheel turning system disclosed in U.S. Pat. No. 4,645,025, the rear wheels are turned by an electric motor which is driven by an onboard battery. In the case of a rear wheel turning system which is driven by a battery, the rear wheels can be turned even after the engine stalls, and accordingly, the aforesaid problems inherent to a rear wheel turning system in which the rear wheels are turned by the engine output power can be avoided. However, there arises another problem in that the battery can die if the driver keeps the engine in a stalled state for a long time.

SUMMARY OF THE INVENTION

In view of the foregoing observations and description, the primary object of the present invention is to provide a rear wheel turning system in which the rear wheels are turned by an actuator driven by a battery and which is free from the problems that occur when the vehicle is made to behave as a two-wheel-steered vehicle as soon as the engine stalls or when the vehicle is kept in a stalled state for a long time and the battery dies.

The rear wheel turning system in accordance with the present invention comprises an actuator including an electric motor which is energized by a battery, the battery being mounted on the vehicle body and charged by an alternator driven by the engine, a rear wheel turning mechanism which is driven by the electric motor and turns the rear wheels, and a control means which outputs a control signal to the electric motor in order to cause the rear wheels to turn to a predetermined turning angle according to the operating condition of the vehicle, and is characterized in that an engine stall detecting means which detects that the engine has stalled and outputs a detecting signal is provided, and said control means ceases controlling the electric motor when a predetermined condition is established after the engine stall detecting means outputs the detecting signal.

For example, the predetermined condition may be that the turning angle of the front wheels is zero, and when the predetermined condition is established, the rear wheels are held in the straight-ahead position so that the vehicle behaves as a two-wheel-steered vehicle until the engine is restarted, for example.

After the engine stall detecting means outputs the detecting signal, the control means may continue to control the electric motor as before (the type of control performed by the control means when the engine is operating normally will be designated the normal type of control) or may control the electric motor in a different way. For example, the control means may shift to a convergence type of control in which the target rear wheel turning angles to which the rear wheels are to be turned during the normal type of control are multiplied by a coefficient which gradually decreases from 1 to 0 over time, and the values thus obtained are adopted as the target rear wheel turning angles. The control means may shift to carrying out the convergence type of control either as soon as the engine stall detecting means outputs the detecting signal or a predetermined time after the same. When the control means shifts to the convergence type of control, it may be considered that the predetermined condition is established when said coefficient becomes 0 and the rear wheel turning angle becomes 0, i.e., when control according to the convergence type of control is completed.

In the case of a rear wheel turning system in which the rear wheels are turned by an actuator which is driven by a battery, the rear wheels can be turned even after the engine stalls, and accordingly, the rear wheel turning system is free from the problems that occur when the vehicle is made to behave as a two-wheel-steered vehicle as soon as the engine stalls. Further, in accordance with the present invention, the control of the electric motor is interrupted from the time a predetermined condition is established after the engines stalls until the engine is restarted, and accordingly, death of the battery can be avoided.

The predetermined condition should be one such that no problem will arise if the vehicle is made to behave as a two-wheel-steered vehicle after the predetermined condition is established. For example, a front wheel turning angle of zero, a state which indicates that cornering is completed or that the vehicle is running straight, is a desirable predetermined condition.

Further, when the control means shifts to carrying out the convergence type of control after the engine stalls, the rear wheels can be positively returned to the straight-ahead position even if the front wheel turning angle does not become zero for a long time, and accordingly, because the rear wheels being in a straight-ahead position is adopted as the predetermined condition, the battery can certainly be prevented from dying and the control of the rear wheels can be smoothly interrupted without any adverse effects.

BRIEF DESCRIPTION OF THE DRAWINGS

FIG. 1 is a schematic plan view of a four wheel steering system in which a rear wheel turning system in accordance with an embodiment of the present invention is employed.

DESCRIPTION OF THE PREFERRED EMBODIMENTS

Figure 2:
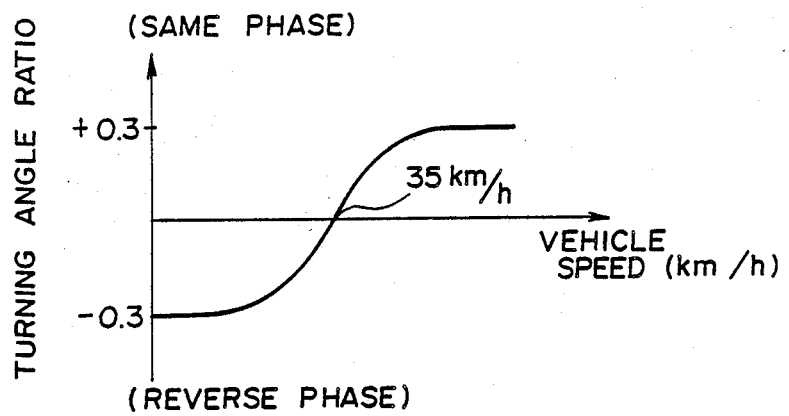
FIGS. 2 and 3 illustrate the operation of the four wheel steering system shown in FIG. 1.

In FIG. 1, a four-wheel steered vehicle is provided with a front wheel turning mechanism 14 for turning left and right front wheels 12L and 12R and a rear wheel turning mechanism 16 for turning left and right rear wheels 6L and 6R in accordance with an embodiment of the present invention.

The front wheel turning mechanism 14 comprises front wheel turning rod 22 provided with a rack (not shown in FIG. 1) in mesh with a pinion 24 on the lower end of a steering shaft 28. A steering wheel 26 is mounted on the upper end of the steering shaft 28. The left front wheel 12L is connected to the left end of the front wheel turning rod 22 by way of a left tie rod 18L and a left knuckle arm 20L, and a right front wheel 12R is connected to the right end of the front wheel turning rod 22 by way of a right tie rod 18R and a right knuckle arm 20R. When the steering wheel 26 is rotated, the front wheel turning rod 22 is displaced in the transverse direction of the vehicle body and the front wheels 12L and 12R are turned.

The rear wheel turning mechanism 16 comprises a rear wheel turning rod 30, a servomotor 4, a ball-screw means 46 which is rotated by the servomotor 4 and displaces the rear wheel turning rod 30 in the transverse direction of the vehicle body, a centering spring means 38 which urges the rear wheel turning rod 30 into the neutral position and a control unit 10 which controls the servomotor 4. An engine-stall detecting means 8 which detects whether the engine of the vehicle has stalled and outputs an engine stall signal when the engine has stalled is connected to the control unit 10, and other various information input means which will become apparent later are connected to the control unit 10.

The rear wheel turning rod 30 extends in the transverse direction of the vehicle body. The left rear wheel 6L is connected to the left end of the rear wheel turning rod 30 by way of a knuckle arm 36L and a tie rod 34L, and the right rear wheel 6R is connected to the right end of the rear wheel turning rod 30 by way of a knuckle arm 36R and a tie rod 34R so that the left and right rear wheels 6L and 6R are turned in response to a displacement of the rear wheel turning rod 30 in the transverse direction of the vehicle body.

The rear wheel turning rod 30 is displaced in the transverse direction of the vehicle body by the servomotor 4. The servomotor 4 is a stepping motor, and is connected to the rear wheel turning rod 30 by way of a driving force transmitting system comprising a brake 40, a double clutch mechanism 42, a reduction gear train 44 and the ball-screw means 46. In response to a control signal from the control unit 10, the servomotor 4 displaces the rear wheel turning rod 30 in the transverse direction of the vehicle body from the neutral position, overcoming the force of the centering spring means 38.

The brake 40 holds the rear wheel turning rod 30 in a predetermined position by locking the driving force transmitting system between the servomotor 4 and the rear wheel turning rod 30 in response to a control signal from the control unit 10. While the steering wheel 26 is fixed, that is, when the target turning angle of the rear wheels is fixed, the rear wheel turning rod 30 should be held in a predetermined position. When the rear wheel turning rod 30 is fixed by the brake 40, the power consumption can be reduced as compared with when it is fixed by the servomotor 4. In this embodiment, the brake 40 comprises an electro-magnetic brake which locks the output shaft of the servomotor 4.

If the system fails, the double clutch mechanism 42 cuts the driving force transmitting system between the servomotor 4 and the rear wheel turning rod 30 and disconnects the rear wheel turning rod 30 from the servomotor 4 in response to a control signal from the control unit 10 as will be described in detail later, thereby permitting the rear wheel turning rod 30 to return to the neutral position under the force of the centering spring means 38.

The double clutch mechanism 42 comprises a pair of electro-magnetic clutches 42A and 42B disposed in series with each other. The clutch 42A nearer to the servomotor 4 is of a normally-open type which is normally disengaged and is engaged when it is energized, and the other clutch 42B is of a normally-closed type which is normally engaged and is disengaged when it is energized.

When a pair of clutches are provided in the driving force transmitting system, the rear wheel turning means can be disconnected from the electric motor even if one of the clutches is unable to disengage. The provision of a pair of clutches allows the rear wheels to be returned to the straight-ahead position with a higher reliability in case the rear-wheel turning system fails. Further, when one of the clutches is a normally-closed type of electromagnetic clutch and the other clutch is a normally-open type of electro-magnetic clutch, the reliability of the system can be further improved and at the same time, the power consumption can be reduced. That is, when the clutches are both of the normally-open type, the clutches must be kept energized so long as the rear wheel turning system is in the normal state, and accordingly power consumption is increased. On the other hand, though the power consumption can be greatly reduced when the clutches are both of the normally-closed type, both the clutches are simultaneously disabled and cannot disengage when the power source for the clutches fails.

The ball-screw means 46 comprises a ball nut 48, a ball thread 50 cut on the rear wheel turning rod 30 and balls 52 interposed between the ball nut 48 and the ball thread 50. The ball nut 48 is fixed to a gear 54 which is in mesh with the reduction gear train 44. The ball nut 48 cannot be displaced in the longitudinal direction of the rear wheel turning rod 30 though it can rotate together with the gear 54. With this arrangement, the rear wheel turning rod 30 is displaced in the longitudinal direction thereof in response to the rotation of the output shaft of the servomotor 32.

The centering spring means 38 includes a pair of stoppers 56 and 58 disposed on the rear wheel turning rod 30 at a predetermined distance from each other. A pair of spring retainers 60 and 62 are slidably fitted on the rear wheel turning rod 30 between the stoppers 56 and 58, and a centering spring 64 is compressed between the spring retainers 60 and 62. The rear wheel turning rod 30 extends through the centering spring 64. A pair of stoppers 66 and 68 are formed on the inner side of the housing. The spring retainer 60 abuts against both the stopper 5 on the rear wheel turning rod 30 and the stopper 66 on the housing under the force of the centering spring 64, and the spring retainer 62 abuts against both the stopper 58 on the rear wheel turning rod 30 and the stopper 68 on the housing under the force of the centering spring 64. Thus, the rear wheel turning rod 30 is normally urged into the neutral position by the compression load (preset load) on the centering spring 64.

As shown in FIG. 1, the control unit 10 controls the rear wheel turning mechanism 16 according to the running condition of the vehicle on the basis of predetermined four-wheel steering characteristics.

Figure 3:
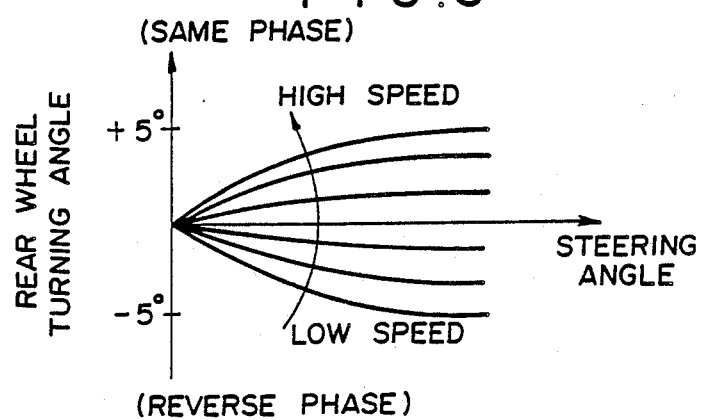

In this embodiment, the control unit 10 controls the rear wheel turning mechanism 16 so that the rear wheel turning angle ratio, i.e., the ratio of the turning angle of the rear wheels to the ratio of the turning angle of the front wheels, is changed according to the vehicle speed and the turning angle of the steering wheel 26 on the basis of the four-wheel steering characteristics shown in FIGS. 2 and 3. In FIGS. 2 and 3, the rear wheel turning angle ratio is defined to be positive when the rear wheels are turned in the same direction as the front wheels (same phase) and to be negative when the rear wheels are turned in the direction opposite to that of the front wheels (reverse phase).

The control unit 10 receives signals from a vehicle speed detecting means 70, a front wheel turning angle detecting means 72 and a rotary encoder 74 which detects the angular position of the servomotor 4, and determines a target rear wheel turning angle on the basis of the front wheel turning angle and the vehicle speed. Then the control unit 10 outputs a control signal to the servomotor 4, which control signal represents the amount by which the rear wheels are to be turned, and the rotary encoder 74 watches whether the servomotor 4 is correctly operated.

The control unit 10 controls the brake 40 and the double clutch mechanism 42 in addition to the servomotor 32. The control unit 10 causes the brake 40 to lock the output shaft of the servomotor 4. Thereby the brake 40 bolds the rear wheel turning rod 30 in the predetermined position corresponding to the target rear wheel turning angle so long as the rear wheel turning system is normal. In case the rear wheel system fails, the control unit 10 disengages the double clutch mechanism 42, which permits the rear wheel turning rod 30 to return to the neutral position under the force of the centering spring means 38.

In this particular embodiment, a first measure mode or a second measure mode is taken according to the kind of failure which occurs.

The first measure mode is taken in the case of a failure such as one that disables the control of the rear wheels 6L and 6R by the servomotor 4, e.g., a failure in the servomotor 4, the control unit 10, the rotary encoder 74 or the like. In the first measure mode, the double clutch mechanism 42 is disengaged and the rear wheels are returned to the straight-ahead position under the force of the centering spring means 38.

The second measure mode is taken in the case of a failure such as one that does not permit correct four-wheel steering control but permits turning of the rear wheels and detection of the position of the rear wheels, e.g., a failure in the vehicle speed sensor 70, the front wheel turning angle sensor 72 and the like. In the second measure mode, the rear wheels are turned to the straight-ahead position by the servomotor 4.

The control unit 10 further effects a delay type of control and a phase inverting type of control. That is, with the delay type of control, the rear wheels are turned in the same direction as the turning direction of the front wheels a predetermined time after the front wheels are turned when the front wheels and the rear wheels are to be turned in the same phase, and with the phase inverting type of control, the rear wheels are first turned in the direction opposite to the turning direction of the front wheels for a predetermined time and then are turned in the same direction as the turning direction of the front wheels. Either of the delay type of control or the phase inverting type of control serves to compensate for the deterioration in the heading performance which would occur if the front wheels and the rear wheels were simultaneously turned in the same direction.

The vehicle speed detecting means 70 comprises first and second vehicle speed sensors 70A and 70B, and the front wheel turning angle detecting means 72 comprises a first front wheel turning angle sensor 72A which detects the turning angle of the steering wheel 26 and a second front wheel turning angle sensor 72B which detects the displacement of the front wheel turning rod 22. The turning angle of the front wheels is then determined from the turning angle of the steering wheel 26. The turning angle of the front wheels is also determined from the displacement of the front wheel turning rod 22. Further, a rear wheel turning angle sensor 76 which detects the displacement of the rear wheel turning rod 30 is provided in addition to the rotary encoder 74 which detects the angular position of the servomotor 4. From the displacement of the rear wheel turning rod 30 the turning angle of the rear wheels is determined, and from the angular position of the servomotor 4 the turning angle of the rear wheels is also determined. That is, the vehicle speed, the front wheel turning angle and the rear wheel turning angle are doubly detected, whereby various failures in the rear wheel turning system can surely be detected when they occur, and the reliability of the system can be improved. Further, on-off signals from a neutral clutch switch 78, an inhibitor switch 80, a brake switch 82 and an ignition switch 84 are input into the control unit 10 and a signal which represents whether or not an alternator is generating electricity is input into the control unit 10 from an L-terminal of the alternator. Reference numeral 88 denotes a warning lamp which is lit when any failure occurs in the system.

The engine stall detecting means 8 inputs a detecting signal which represents that the engine has stalled into the control unit 10, and the control unit 10 ceases operation when a predetermined condition is established after the engine stall detecting means 8 outputs the detecting signal.

Figure 4:
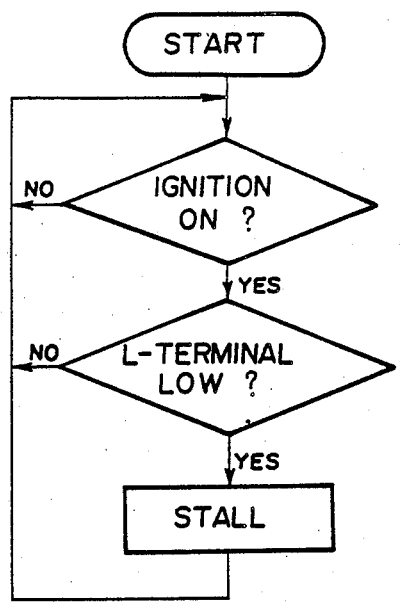
FIG. 4 is a flow chart of the operation of an example of the engine stall detecting means.
Figure 5:
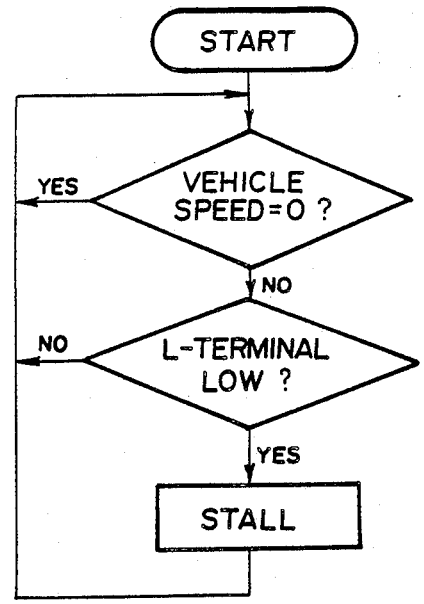
FIG. 5 is a flow chart of the operation of another example of the engine stall detecting means.

The engine stall detecting means 8 may comprise a microprocessor which determines whether the engine has stalled on the basis of whether the ignition switch 84 is on and whether the output of the L-terminal 86 of the alternator is low as shown in FIG. 4, or on the basis of whether the vehicle speed is zero and whether the output of the L-terminal 86 of the alternator is low as shown in FIG. 5. In the former arrangement, the engine stall detecting means 8 determines that the engine has stalled when the ignition switch 84 is on and the output of the L-terminal 86 of the alternator is low, and outputs the detecting signal. In the latter arrangement, the engine stall detecting means 8 determines that the engine has stalled when the vehicle speed is not zero and the output of the L-terminal 86 of the alternator is low, and outputs the detecting signal. In accordance with the latter arrangement, the engine stall detecting means 8 outputs the detecting signal even when the driver intentionally turns off the ignition switch 84 and the vehicle is running by inertia, such as when the vehicle is running downhill. In this specification, the engine should be considered to be "stalled" even when the ignition switch is turned off while the vehicle is running at a certain speed by inertia.

Figure 6:
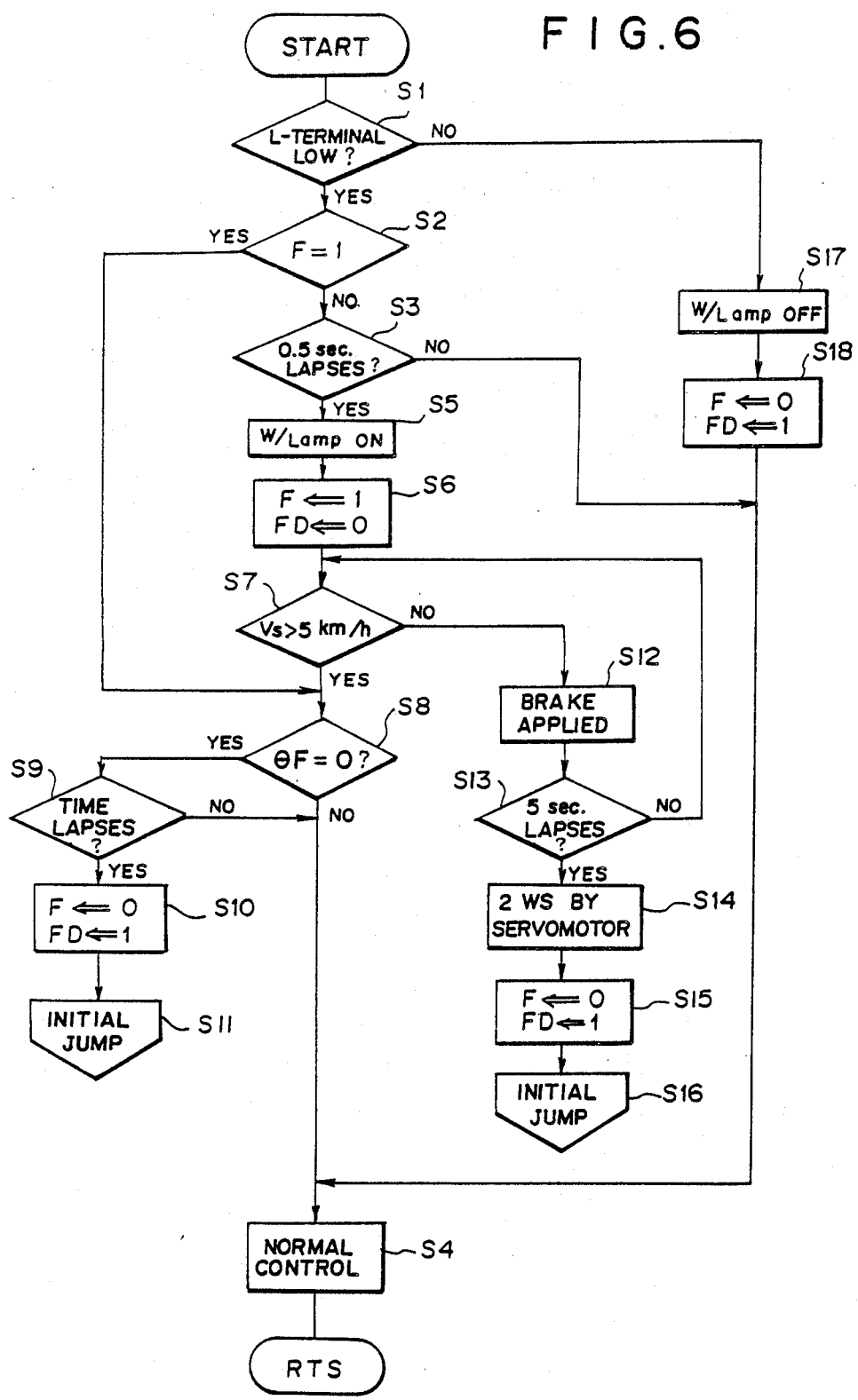
FIG. 6 is a flow chart for illustrating an example of the type of control which is carried out by the control unit after the engine stalls.

FIG. 6 shows an example of the operations performed by the control unit 10 after the engine has stalled.

As soon as the control unit 10 receives the detecting signal from the engine stall detecting means 8, the control unit 10 determines in step S1 whether the output of the L-terminal 86 is low. Since the engine has stalled, the answer in step S1 is YES and accordingly, the control unit 10 proceeds to step S2. In step S2, the control unit 10 determines whether an engine stall flag F is set to "1", the flag F being set to "1" when it has determined that the engine has stalled. In this case, the engine has just stalled and the flag F should not have been set to "1", and accordingly, the answer in step S2 is NO and the control unit 10 proceeds to step S3. In step S3, the control unit 10 determines whether the output of the L-terminal 86 has been low for 0.5 seconds. If it is determined in step S3 that the output of the L-terminal 86 has been low for 0.5 seconds, the control unit 10 lights the warning lamp 88 in step S5, and sets the flag F to 1 and resets a delay control allowance flag FD to "0" in step S6. The delay control allowance flag FD is for allowing the control unit 10 to perform the delay type of control, and the delay type of control is performed when the delay control allowance flag FD is in the "1" position. Step S3 is carried out in order to prevent the control unit 10 from determining that the engine has stalled when the generation of electricity by the alternator is momentarily interrupted and the output of the L-terminal 86 momentarily turns low. Further, the delay type of control is inhibited (i.e., the delay control allowance flag FD is reset to "0") from being performed in step S6 in order to prevent the heading performance from being improved when the driver is confused and turns the steering wheel in response to the stalling of the engine.

Then the control unit 10 determines in step S7 whether the vehicle speed Vs is higher than 5 Km/h. If it is determined that the vehicle speed Vs is higher than 5 Km/h, the control unit 10 continues to carry out the normal type of control until the front wheel turning angle $\theta_F$ becomes zero (steps S8 and S4). When the front wheel turning angle $\theta_F$ becomes zero and continues to be zero for a predetermined time (e.g., 0.5 to 1 second), the control unit 10 resets the engine stall flag F and sets the delay control allowance flag FD (steps S9 and S10). Thereafter, the control unit 10 executes an initial jump (step S11).

If it is determined in step S7 that the vehicle speed Vs is not higher than 5 Km/h, the control unit 10 causes the brake 40 to hold the rear wheels at their current turning angle until 5 seconds have lapsed (steps S12 and S13), and then causes the servomotor 4 to return the rear wheels to the straight-ahead position and to hold the rear wheels there so that the vehicle behaves as a two-wheel-steered vehicle (step S14). Then, the control unit 10 resets the engine stall flag F and sets the delay control allowance flag FD (step S15) and makes an initial jump (step S16).

If the driver restarts the engine before the control unit 10 makes an initial jump in step S11 or S16, the answer in step S1 turns to NO. In such a case, the control unit 10 turns off the warning lamp 88 in step S17, and resets the engine stall flag F and sets the delay control allowance flag FD in step S18. Thereafter, the control unit 10 proceeds to step S4 and carries out the normal type of control.

In the flow chart shown in FIG. 6, different types of control are carried out according to whether the vehicle speed is high or low (higher or lower than 5 km/h). That is, when the vehicle speed is high, a front wheel turning angle of zero is adopted as the predetermined condition, and when the vehicle speed is low, a predetermined time lapse after the engine has stalled is adopted as the predetermined condition. Further, when the vehicle speed is high, the control unit 10 continues to perform the normal type of control even after the engine has stalled though it interrupts its performance of the normal type of control a predetermined time after the engine has stalled. On the other hand, when the vehicle speed is low, the control unit 10 holds the rear wheels at the turning angle they are set at when the engine stalls.

It may be considered that cornering has been completed when the front wheel turning angle becomes zero, and accordingly, the problem of the turning radius of the vehicle changing during cornering can be avoided when the control unit 10 interrupts its control operations when the front wheel turning angle becomes zero and makes the vehicle behave as a two-wheel-steered vehicle. Further since the rear wheel turning angle is also zero when the front wheel turning angle is zero, the attitude of the vehicle does not change if the vehicle is made to behave as a two-wheel-steered vehicle when the front wheel turning angle is zero. This is the reason why the control unit 10 is arranged so that when the engine stalls while the vehicle is turning at a high speed, it interrupts its control of the turning of the rear wheels at the time the front wheel turning angle becomes zero.

On the other hand, if a normal type of control is carried out when the vehicle speed is low, the road surface resistance is large and power consumption is significant. Further when the normal type of control is not carried out, it is preferable for the rear wheels to be held for a predetermined time at the turning angle they are set at when the engine stalls in order to prevent a change in the turning radius of the vehicle or the attitude of the vehicle during cornering at a low speed, for instance. This is, this is the reason why the control unit 10 is arranged so that when the engine stalls while the vehicle is running at a low speed, it holds the rear wheels at the turning angle they are set at when the engine stalls.

In the flow chart shown in FIG. 6, step S9 may be omitted so that the control unit 10 proceeds to step S10 as soon as the front wheel turning angle becomes zero. Further, the control unit 10 may be arranged so that it jumps over steps S13 and S14 and directly proceeds to step S15 when the front wheel turning angle becomes zero after the brake 40 has been applied in step S12. Further, the control unit 10 may be arranged so that it continues to perform the normal type of control until the front wheel turning angle becomes zero irrespective of the vehicle speed.

Figure 7:
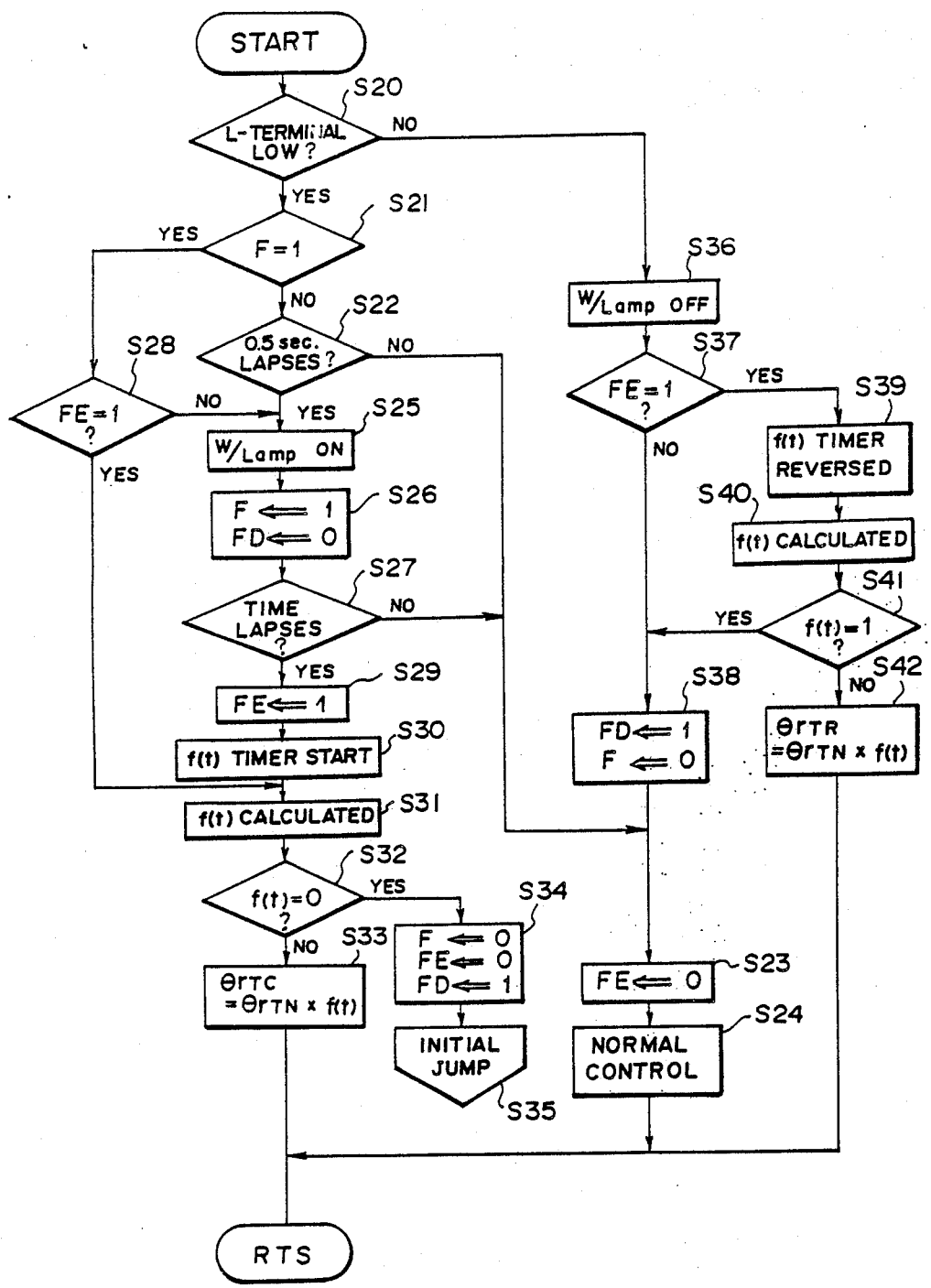
FIG. 7 is a flow chart for illustrating another example of the type of control which is carried out by the control unit after the engine stalls.

FIG. 7 shows another example of the operation of the control unit 10 after the engine has stalled.

As soon as the control unit 10 receives the detecting signal from the engine stall detecting means 8, it determines in step S20 whether the output of the L-terminal 86 is low. Since the engine has stalled, the answer in step S20 is YES and accordingly, the control unit 10 proceeds to step S21. In step S21, the control unit 10 determines whether an engine stall flag F is set to "1". If the engine has just stalled, the flag F should not have been set to "1", and accordingly, the answer in step S21 is NO. Then the control unit 10 proceeds to step S22. In step S22, the control unit 10 determines whether the output of the L-terminal 86 has been low for 0.5 seconds. If it is determined in step S22 that the output of the L-terminal 86 has been low for 0.5 seconds, the control unit 10 lights the warning lamp 88 in step S25, and sets the flag F to 1 and resets a delay control allowance flag FD to "0" in step S26. On the other hand, if it is determined in step S22 that the output of the L-terminal 86 has not been low for 0.5 seconds, the control unit 10 proceeds to step S23 and resets a convergence control flag FE (to be described later) to "0", though the flag FE has not been set to "1" yet. Thereafter, the control unit 10 carries out the normal type of control.

After setting the flag F to "1" and resetting the flag FD to "0" in step S26, the control unit 10 determines in step S27 whether a predetermined time has lapsed since the engine stall flag F has been set to "1". The predetermined time may be suitably set taking into account various factors. For example, the predetermined time may be set to 10 to 15 seconds which is the time in which the driver may be expected to restart the engine. When it is determined in step S27 that the predetermined time has lapsed since the engine stall flag F has been set to "1", the control unit 10 proceeds to steps S23 and S24 and carries out the normal type of control. Then the control unit 10 continues to carry out the normal type of control until the predetermined time lapses (steps S20, S21, S28, S25, S26, S27, S23, S24).

When the predetermined time has lapsed, the control unit 10 proceeds to step S29 and sets the convergence control flag FE to "1". The convergence control flag FE indicates that the convergence type of control is to be carried out. With the convergence type of control, the target rear wheel turning angles $\theta$rTN to which the rear wheels are to be turned when the normal type of control is carried out are multiplied by a coefficient f(t) which gradually decreases from 1 to 0 as the time t lapses, and the values thus obtained are adopted as the target rear wheel turning angles $\theta$rTC. After step S29, the control unit 10 starts the timer which counts the time t, the value from the timer being used in the calculation of the coefficient f(t) (steps S30 and S31). Further, the control unit 10 determines in step S32 whether the coefficient f(t) is zero. When it is determined that the coefficient f(t) is not zero, the control unit 10 proceeds to step S33 and carries out the convergence type of control, that is, controls the servomotor 4 with the target rear wheel turning angle $\theta$rTC being set at $\theta$rTN$\times$f(t). Thereafter, the control unit 10 continues to perform the convergence type of control until the coefficient f(t) becomes zero (steps S20, S21, S28, S31, S32, S33). When the coefficient f(t) becomes zero, the control unit 10 finishes carrying out the convergence type of control. The control unit 10 resets the engine stall flag F and the convergence control flag FE and sets the delay control allowance flag FD (step S34), and then it makes an initial jump (step S35).

When the driver restarts the engine after the engine stall flag F is set, the control unit 10 carries out the following type of control.

When the engine is restarted, the output of the L-terminal 86 turns high, and accordingly, the control unit 10 proceeds to step S36 and turns off the warning lamp 88. Then the control unit 10 determines in step S37 whether the convergence control flag FE has been set.

If it is determined in step S37 that the convergence control flag FE has not been set, which means that the control unit 10 is carrying out the normal type of control, the control unit 10 proceeds to step S38. In step S38, the control unit 10 sets the delay control allowance flag FD and sets the engine stall flag F. Thereafter, the control unit 10 proceeds to step S23 and continues to perform the normal type of control.

If it is determined in step S37 that the convergence control flag FE has been set, the control unit 10 proceeds to step S39 and reverses the timer for the coefficient f(t). Then in step S40, the control unit 10 calculates the coefficient f(t) on the basis of the time t counted by the timer. Since the timer has been reversed, the value of t decreases as the time lapses, and accordingly, the value of the coefficient f(t) gradually increases to 1 as the time lapses. Further, the control unit 10 determines in step S41 whether the coefficient f(t) is 1. If it is determined that the coefficient f(t) is not 1, the control unit 10 proceeds to step S42 and carries out a returning type of control. That is, the control unit 10 controls the servomotor 4 with the target rear wheel turning angle $\theta rTR$ during the performance of the returning type of control being set to be $\theta rTN \times f(t)$. Thereafter, the control unit 10 continues to perform the returning type of control until the coefficient f(t) becomes 1 (steps S20, S36, S37, S39 to S42). When the coefficient f(t) becomes 1 and execution of the returning type of control is completed, the control unit 10 proceeds to step S38 from step S41 and shifts to carrying out the normal type of control (steps S23 and S24). When the returning type of control is carried out before the control unit 10 shifts to carrying out the normal type of control, an abrupt change in the attitude of the vehicle can be prevented in cases where the engine is restarted during the carrying out of the convergence type of control.

Figure 8:
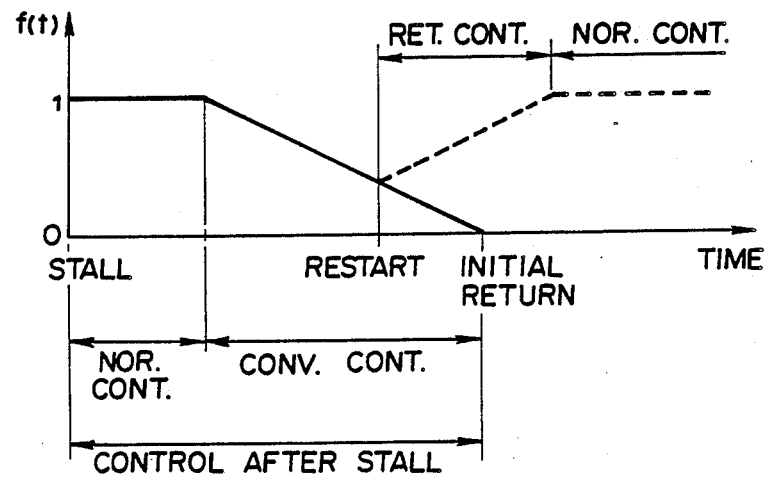
FIG. 8 shows the change of the coefficient f(t) during control by the control unit.

In the control shown in FIG. 7, the normal type of control continues to be carried out for a predetermined time after the engine has stalled and then the type of control carried out is shifted to the convergence type. When the performance of the convergence type of control is completed (the rear wheel turning angle having become zero by this time), the control unit 10 stops controlling the servomotor 4. That is, when the performance of the convergence type of control is completed, the control unit 10 makes the vehicle behave as a two-wheel-steered vehicle and makes an initial jump. Thereafter, the control unit 10 does not control the servomotor 4 until the engine is restarted. FIG. 8 shows the change of the coefficient f(t) during control by the control unit.

The flow chart shown in FIG. 7 may be modified in various ways. For example, when the front wheel turning angle becomes zero while the control unit 10 continues to carry out control after the engine has stalled (either the normal type of control or the convergence type of control), the control unit 10 may make the initial jump. Otherwise, the control unit 10 may carry out the convergence type of control as soon as the engine stalls.

As can be understood from the description above, in the rear wheel turning system in accordance with the present invention, the control means is arranged to continue controlling the electric motor until a predetermined condition is established after the engine has stalled.

The predetermined condition may be set as desired. For example, a front wheel turning angle of zero, a predetermined lapse of time, the completion of the carrying out of the convergence type of control (completion of the convergence type of control may be regarded as occurring after a certain lapse of time if the time the coefficient f(t) takes to decrease to 0 from 1 is fixed), the turning off of the ignition switch, or the lowering of the voltage of the battery below a predetermined value (e.g., 8 v) may be set as the predetermined condition.

The type of control executed from when the engine stalls until the predetermined condition is established may be set as desired. For example, the control means may be arranged so that it continues to carry out the normal type of control after the engine has stalled, or so that it shifts to carrying out the convergence type of control, or so that it holds the rear wheels at the turning angle they are set at when the engine stalls. Further, the control means may be arranged so that it carries out two or more of such types of control according to the situation.

Further, it is preferred that the control means be arranged so that it returns the rear wheels to the straight-ahead position and makes the vehicle behave as a two-wheel-steered vehicle before it ceases its control operations in the case where the rear wheels can be in a position other than the straight-ahead position upon establishment of the predetermined condition, e.g., when the control means is arranged so that it continues to perform the normal type of control after the engine has stalled, or so that it holds the rear wheels at the turning angle they are set at when the engine stalls.

When the engine is restarted, the normal type of control may continue to be carried out after a proper returning type of control has been carried out, if necessary.

Though, in the embodiment described above, the rear wheel turning mechanism is driven by the output power of the servomotor, it may be driven by the output power of a hydraulic power cylinder which is provided with hydraulic pressure by a hydraulic pump driven by an electric motor which is energized by the battery.

I claim:

1. A rear wheel turning system for turning rear wheels of an engine driven vehicle in response to turning of front wheels of the vehicle comprising an actuator including an electric motor which is energized by a battery, the battery being mounted on the vehicle body and charged by an alternator driven by the engine, a rear wheel turning mechanism which is driven by the electric motor and turns the rear wheels, and a control means which outputs a control signal to the electric motor in order to cause the rear wheels to turn to a predetermined turning angle according to the operating condition of the vehicle, characterized in that an engine stall detecting means which detects that the engine stalls and outputs a detecting signal is provided, and said control means is arranged to cease controlling the electric motor when a predetermined condition is established after the engine stall detecting means outputs the detecting signal.

2. A rear wheel turning system as defined in claim 1 in which said engine stall detecting means outputs the detecting signal when the ignition switch of the vehicle is on and the output of the L-terminal of the battery is low.

3. A rear wheel turning system as defined in claim 1 in which said engine stall detecting means outputs the detecting signal when the vehicle speed is not zero and the output of the L-terminal of the battery is low.

4. A rear wheel turning system as defined in claim 1 in which said control means continues to carry out a normal type of control, which is carried out before the engine stall detecting means outputs a detecting signal, after the engine stall detecting means has output a detecting signal until said predetermined condition is established.

5. A rear wheel turning system as defined in claim 4 in which said control means ceases controlling the electric motor when the front wheel turning angle becomes zero after the engine stall detecting means outputs the detecting signal.

6. A rear wheel turning system as defined in claim 5 in which said control means ceases controlling the electric motor when the front wheel turning angle has been zero for a predetermined time after the engine stall detecting means outputs the detecting signal.

7. A rear wheel turning system as defined in claim 4 in which said control means continues to carry out the normal type of control when the vehicle runs at a high speed.

8. A rear wheel turning system as defined in claim 7 in which, when the vehicle runs at a low speed, said control means keeps the rear wheel turning angle at the same angle it is at when the engine stall detecting means outputs the detecting signal.

9. A rear wheel turning system as defined in claim 1 in which said control means keeps the rear wheel turning angle at the same angle it is at when the engine stall detecting means outputs the detecting signal.

10. A rear wheel turning system as defined in claim 1 in which said control means ceases controlling the electric motor when a predetermined time has lapsed after the engine stall detecting means outputs the detecting signal.

11. A rear wheel turning system as defined in claim 10 in which said control means causes the electric motor to return the rear wheels to the straight-ahead position and to hold them there before it ceases its control operations.

12. A rear wheel turning system as defined in claim 1 in which when the engine stall detecting means outputs the detecting signal, said control means shifts from carrying out a normal type of control to carrying out a convergence type of control, said normal type of control being carried out before the engine stall detecting means outputs the detecting signal and said convergence control being a type of control in which the target rear wheel turning angles to which the rear wheels are to be turned during the carrying out the normal type of control are multiplied by a coefficient which gradually decreases from 1 to 0 over time, and the values thus obtained are adopted as the target rear wheel turning angles.

13. A rear wheel turning system as defined in claim 12 in which the type of control carried out is shifted to the convergence type of control as soon as the engine stall detecting means outputs the detecting signal.

14. A rear wheel turning system as defined in claim 12 in which said control means shifts to carrying out the convergence type of control after it has continued to carry out the normal type of control for a predetermined time after the engine stall detecting means outputs the detecting signal.

* * * * *